United States Patent Office 3,425,892
Patented Feb. 4, 1969

3,425,892
CEMENT SET RETARDER
Martin R. Edelson, Adelphi, and Richard L. Angstadt, Silver Spring, Md., assignors to W. R. Grace & Co., New York, N.Y., a corporation of Connecticut
No Drawing. Filed Oct. 22, 1965, Ser. No. 502,308
U.S. Cl. 106—89                5 Claims
Int. Cl. C04b 7/56

ABSTRACT OF THE DISCLOSURE

A process for retarding the setting time of a gypsum containing cement by adding 0.1 to 5 percent ferrous sulfate to the cement.

---

This application relates to a cement composition having a retarded hardening rate and to the method for making this composition.

In summary, the process of this invention is a method for producing a cement mixture having a reduced hardening rate comprising adding to Portland cement from about 0.1 to 5 percent ferrous sulfate based on the dry weight of the Portland cement, and intimately mixing the ingredients to provide a uniform distribution of the ferrous sulfate throughout the cement.

In summary, the process of this invention is a method for reducing the rate of hardening of Portland cement comprising mixing Portland cement, water, and from 0.1 to 5 percent of ferrous sulfate based on the dry weight of the cement binder, and allowing the mixture to harden.

In summary, the composition of this invention comprises Portland cement containing from about 0.1 to 5 percent ferrous sulfate based on the dry weight of the cement binder.

In many of the uses of Portland cement, it is desirable to retard the rate of hardening thereof. The retardation gained using ferrous sulfate is useful in placing Portland cement mortars and concretes in hot weather when ambient conditions tend to accelerate the hardening rate. In general, under both hot and cold ambient conditions, the use of ferrous sulfate as a retarder will effect an extension of the time available for mixing and placing such materials. In the process for cementing oil wells, the cement must remain sufficiently fluid to be pumped into the well without the use of high pump pressures and agitation of partially set cements.

In U.S. Patent 2,307,270 the substitution of ferrous sulfate for the gypsum ordinarily interground with the cement clinker to form Portland cement has been disclosed. The gypsum controls the flash set otherwise obtained due to the hydration of the tricalcium aluminate phase in Portland cement. In the present invention, however, the ferrous sulfate is added to Portland cement, cement which has already been interground with gypsum, and is not used as a gypsum substitute.

In U.S. Patent 931,884 a waterproof cement composition is taught. The waterproof cement composition is produced by forming Portland cement mortar or concrete mixtures with a mixture of aluminum sulfate and a quantity of soluble calcium hydroxide in excess of that required to react with the aluminum sulfate to form a colloidal precipitate of aluminum hydroxide. Substitution of ferrous sulfate for the aluminum sulfate in this respect is also taught. The calcium hydroxide reacts immediately with the aluminum or ferrous salt to form the corresponding insoluble hydroxide or oxide hydrate. Both the aluminum sulfate and ferrous sulfate mixtures with the soluble calcium hydroxide have been found to accelerate the hardening rate of Portland cements mixed therewith. In contrast, in this invention no quantity of soluble calcium hydroxide sufficient to precipitate the ferrous sulfate as ferrous hydroxide is added therewith, and the ferrous sulfate has been found to act as a very effective retarder for the hardening rate of Portland cements.

It is the object of this invention to provide a method for retarding the hardening rate of Portland cements with a ferrous sulfate retarder.

It is another object of this invention to provide Portland cements having a retarded rate of hardening but without decreasing the final compressive strength of the set product.

The binder component in the cements, mortars and concretes used widely as a construction material is Portland cement. Portland cement is manufactured by calcining a mixture of lime stone and clay to form a clinker, and by grinding the clinker to a fine powder with gypsum. The major compounds found in Portland cement clinker are tricalcium silicate, dicalcium silicate, tricalcium aluminate, and tetracalcium aluminoferrite. The tricalcium and dicalcium silicates are thought to be the principal bonding constituent in the Portland cement. Tricalcium silicate when mixed with water forms a calcium silicate hydrate known as tobermorite gel and calcium hydroxide. The dicalcium silicate when contacted with water forms similar products but at a much lower rate of reaction. The tricalcium silicate, having the greater rate of reaction determines, to a large extent, the hardening rate of the cement. To provide materials which are suitable for different uses, Portland cements having a range of hardening rates have been found desirable. By producing cements having a range of proportions of tricalcium silicate present, a range of hardening rates has been obtained. Four general types of Portland cements, varying principally in the relative quantities of tricalcium silicate and dicalcium silicate present therein, are commonly produced. The proportions of the principal compounds present in each type of cement are shown in Table I.

TABLE I

| Cement type | I | II | III | IV |
|---|---|---|---|---|
| Composition, wt. percent: | | | | |
| Tricalcium silicate | 53 | 47 | 58 | 26 |
| Dicalcium silicate | 24 | 32 | 16 | 54 |
| Tricalcium aluminate | 8 | 3 | 8 | 2 |
| Tetracalcium aluminoferrite | 8 | 12 | 8 | 12 |

The term "Portland cement" as employed herein is defined as including neat pastes, mortars, and concretes and the mixed, dry, unreacted ingredients of neat pastes, mortars, and concretes, comprising a Portland cement binder, said Portland cement containing sufficient gypsum to prevent flash setting due to hydration of the tricalcium aluminate phase.

A wide range of the hardening rates can be obtained by producing cement having varying quantities of tricalcium silicate such as are shown in Table I. However, the particular proportion of the cement ingredients and the rate of hardening obtained is limited by the types of raw materials from which the cement is produced. As a result, for some uses even the Type IV cement does not harden at a desired slow rate.

Retarders are employed to meet these requirements. Retarders are compositions which have been found to decrease the initial rate of hardening of a cement. Portland cement retarders must not decrease the final compressive strength of the hardened cement, and ferrous sulfate meets this requirement.

Retardation of Portland cements with ferrous sulfate can be obtained with from about 0.1 to 5 percent ferrous sulfate in the Portland cement binder. Concentrations of ferrous sulfate greater than about 1.5 percent do not greatly increase retardation, providing a safeguard in the event that excessive quantities are added.

The ferrous sulfate can be added to the Portland cement by various techniques. Ferrous sulfate can be added to Portland cement binder clinker prior to grinding and can be thoroughly mixed with the cement component during the grinding step. The retarder can also be added to the Portland cement powder as a dry powder, slurry, or water solution, and the ingredients can be thoroughly mixed to uniformly disperse the active ingredients. The ferrous sulfate can be dissolved in the water with which the Portland cement binder is mixed to form a hardening composition. The Portland cement binder can be premixed with water and then mixed or contacted with the ferrous sulfate retarder. In general, the retarder can be added to the cement at any stage prior to its final hardening.

Our invention is further illustrated by the following specific, but non-limiting examples.

EXAMPLE 1

In this example ferrous sulfate obtained as a by-product from the Glidden process for the manufacture of titanium dioxide was interground with four different Type I Portland cements. A retarder concentration of 1.0 percent by weight of the Portland cement was employed. The time of set was determined using the Vicat Cement Consistency Tester by the procedure of ASTM C187. The water to cement ratio was 0.35, and at least two experimental determinations were made to obtain each set time. The results obtained are shown in Table A.

TABLE A

| Cement | Retarder | Time of set, min. |
| --- | --- | --- |
| A | Blank | 300 |
| A | FeSO$_4$ | 448 |
| B | Blank | 296 |
| B | FeSO$_4$ | 481 |
| C | Blank | 291 |
| C | FeSO$_4$ | 491 |
| D | Blank | 276 |
| D | FeSO$_4$ | 511 |

EXAMPLE 2

In this example the procedure of Example 1 was followed using reagent grade FeSO$_4$. The times of set obtained are shown in Table B.

TABLE B

| Cement | Retarder | Time of set, min. |
| --- | --- | --- |
| A | Blank | 300 |
| A | FeSO$_4$ | 480 |
| B | Blank | 296 |
| B | FeSO$_4$ | 526 |
| C | Blank | 291 |
| C | FeSO$_4$ | 508 |
| D | Blank | 276 |
| D | FeSO$_4$ | 512 |

EXAMPLE 3

This example shows that the compressive strength of the Portland cement product is not impaired by the use of ferrous sulfate as a retarder.

The 7 day compressive strength of a mortar made using 740 g. of cement A, 2035 g. of sand, and 481 ml. of an aqueous one wt. percent FeSO$_4$ solution was measured, and was found to be 1225±100 p.s.i. A similar mortar made using deionized water rather than the FeSO$_4$ solution was found to have a 7 day compressive strength of 1289±100 p.s.i., differing from the retarded mortar by a strength within experimental error.

Obviously, many modifications and variations of the invention as hereinabove set forth may be made without departing from the essence and scope thereof, and only such limitations should be applied as are indicated in the appended claims.

We claim:
1. A process for producing a cement mixture having a retarded hardening rate comprising:
   (a) adding to a Portland cement containing sufficient gypsum to prevent flash setting from about 0.1 to 5 percent ferrous sulfate based on the dry weight of the Portland cement binder, and
   (b) thoroughly mixing the components of the mixture.
2. A process for producing a cement mixture having a retarded hardening rate comprising:
   (a) adding water and ferrous sulfate to a Portland cement containing sufficient gypsum to prevent flash setting, the amount of ferrous sulfate added being from about 0.1 to 5 percent of the dry weight of the Portland cement binder, and
   (b) thoroughly mixing the components of the mixture.
3. A process for retarding the hardening rate of Portland cement comprising:
   (a) adding to a Portland cement containing sufficient gypsum to prevent flash setting from about 0.1 to 5 percent ferrous sulfate based on the dry weight of the Portland cement binder,
   (b) mixing the components to form a homogeneous mixture, and
   (c) adding water to the mixture.
4. A process for retarding the hardening rate of a Portland cement containing sufficient gypsum to prevent flash setting comprising:
   (a) mixing from about 0.1 to 5 percent ferrous sulfate based on the dry weight of binder with a Portland cement binder clinker,
   (b) grinding the mixture to form a fine particle size, homogeneous cement, and
   (c) adding water to the mixture.
5. A cement composition consisting essentially of a Portland cement containing sufficient gypsum to prevent flash setting and from about 0.1 to 5 percent ferrous sulfate based on the dry weight of the Portland cement binder.

References Cited

UNITED STATES PATENTS

| | | | |
| --- | --- | --- | --- |
| 931,884 | 8/1909 | McCormick | 106—89 |
| 1,296,468 | 3/1919 | Blumenberg | 106—89 |
| 2,307,270 | 1/1943 | Hodge | 106—89 |
| 2,868,295 | 1/1959 | Brooks et al. | 106—89 |
| 3,331,695 | 7/1967 | Angstadt et al. | 106—89 |

TOBIAS E. LEVOW, *Primary Examiner.*

SAMUEL E. MOTT, *Assistant Examiner.*

U.S. Cl. X.R.

106—102, 315